United States Patent [19]
Sullivan et al.

[11] 3,849,819
[45] Nov. 26, 1974

[54] RENOVATING APPARATUS FOR TIRE INNER LINERS

[75] Inventors: Arthur J. Sullivan, Staten Island, N.Y.; Oliver G. Lewis, Westfield, N.J.

[73] Assignee: Exxon Research and Engineering Company, Linden, N.J.

[22] Filed: June 29, 1972

[21] Appl. No.: 267,467

[52] U.S. Cl. .......................... 15/21 D, 51/99, 118/72
[51] Int. Cl. ............................................. A46b 13/02
[58] Field of Search ........ 118/72, 50, 318; 15/21 C, 15/21 D, 21 E; 51/99, 47

[56] References Cited
UNITED STATES PATENTS

| | | | |
|---|---|---|---|
| 1,462,420 | 7/1923 | Mikaelson et al. | 51/47 X |
| 1,471,787 | 10/1923 | Gammeter | 118/318 |
| 1,674,669 | 6/1928 | Stedman | 51/99 X |
| 2,513,213 | 6/1950 | Schick | 15/21 D X |

*Primary Examiner*—John P. McIntosh
*Attorney, Agent, or Firm*—Harold N. Wells

[57] ABSTRACT

An apparatus for renovating tire inner liners comprises a wire brush attached at the end of a rotatable shaft and swivelably mounted within a turret mounted on a sleeve surrounding said shaft. This shaft and its surrounding sleeve are pivotally mounted on a fixed base for movement both horizontally and vertically to facilitate the egress of the brush to the inside of a tire casing. In operation, the wire brush is rotated by an electric motor and swiveled with the turret to abrade the inner surface of the tire casing and prepare it for application of a liquid air barrier coating.

2 Claims, 10 Drawing Figures

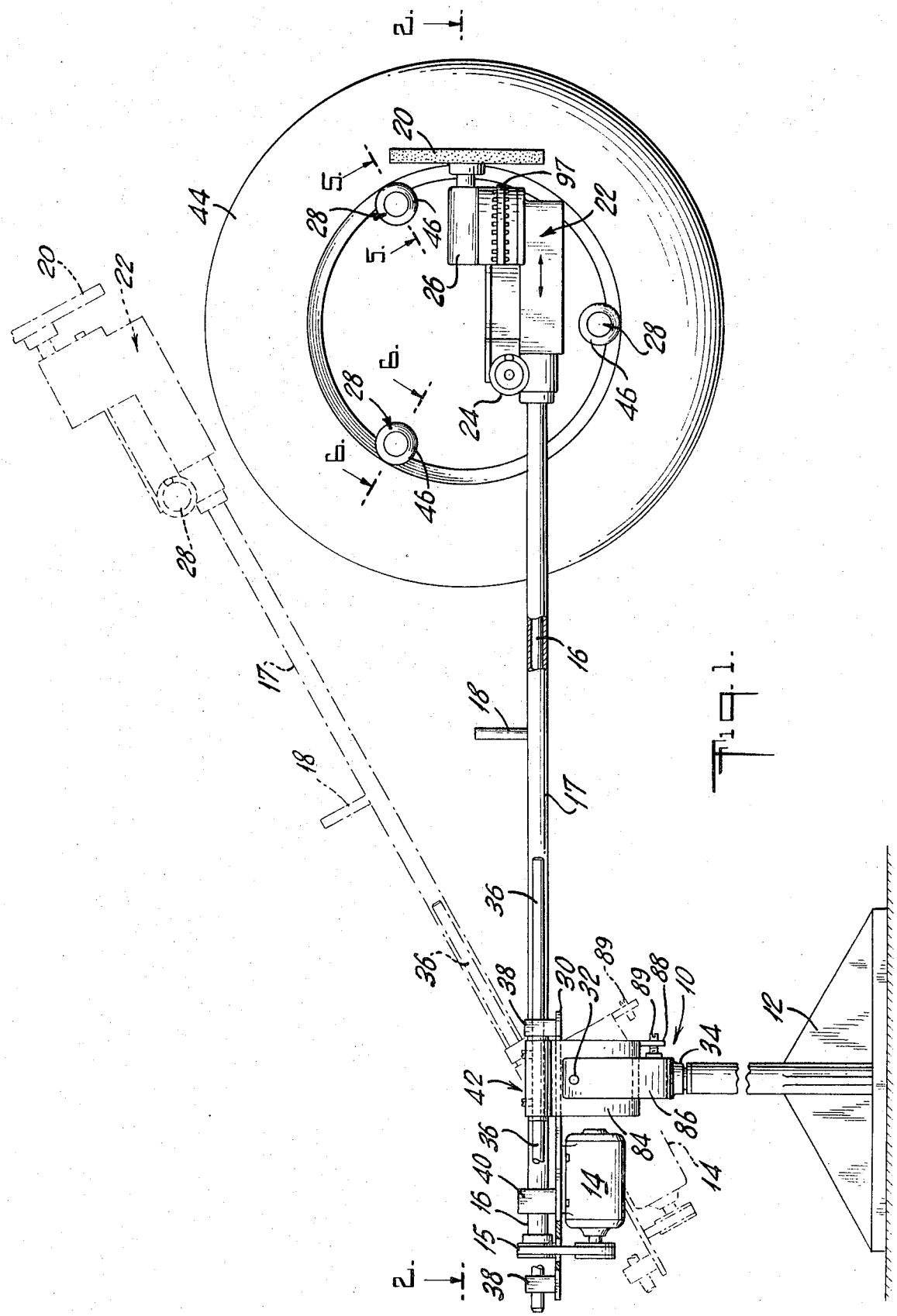

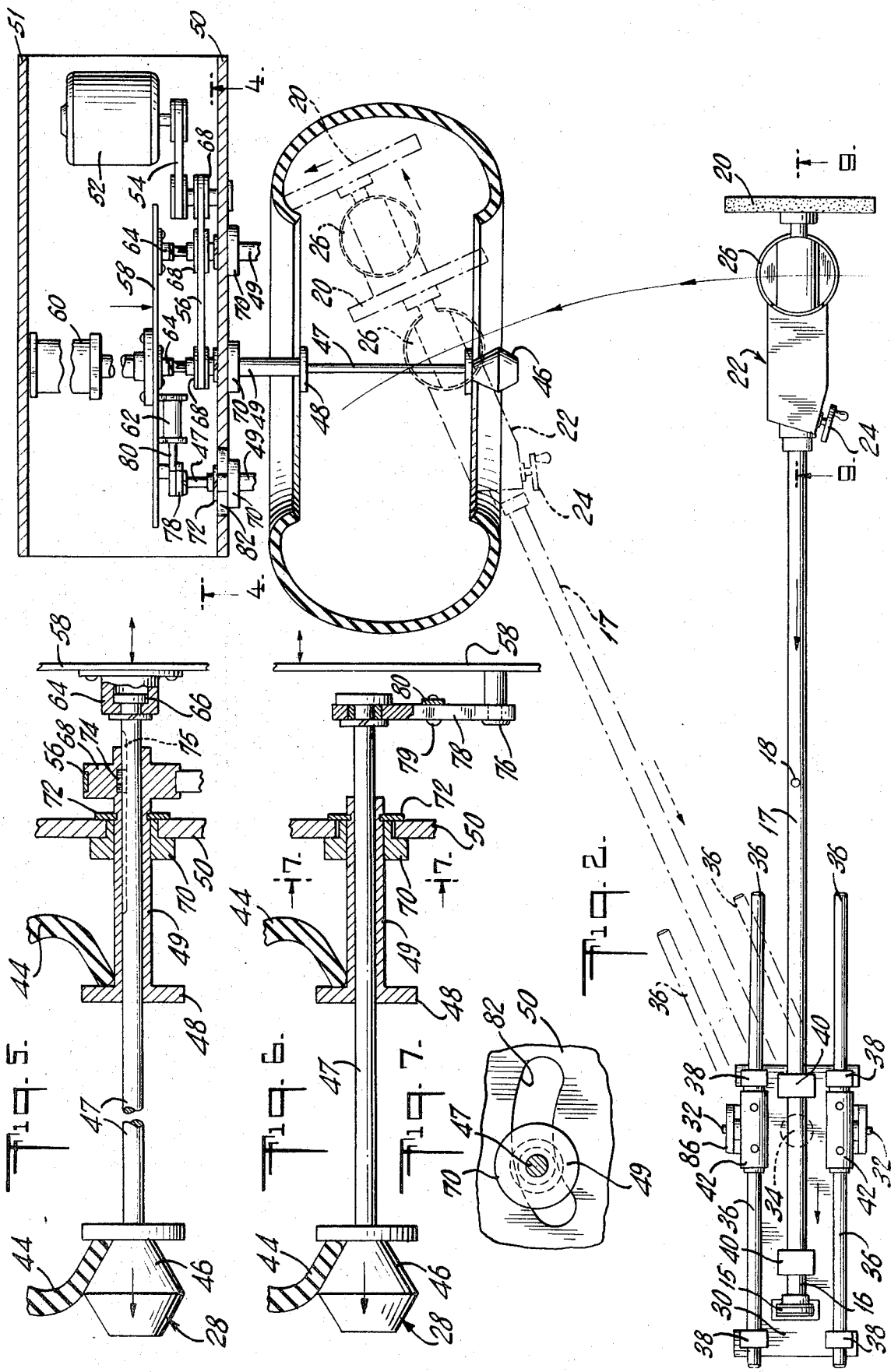

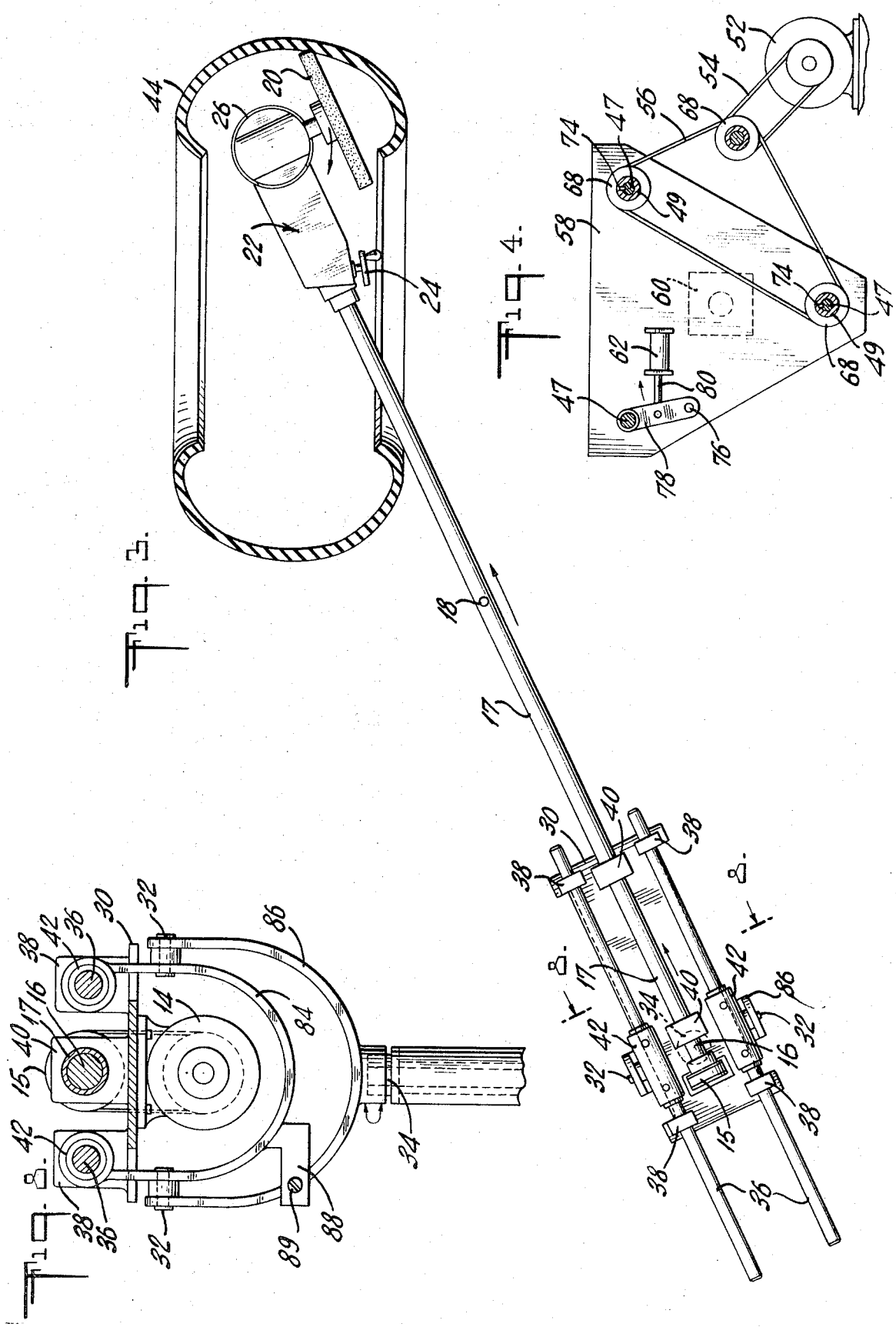

RENOVATING APPARATUS FOR TIRE INNER LINERS

BACKGROUND OF THE INVENTION

CROSS REFERENCE TO RELATED APPLICATIONS

This application is related to U.S. Ser. No. 137,942 issued as U.S. Pat. No. 3,769,122.

PRIOR ART

The liquid rubber-based coating which is the subject of the related applications may be applied to the inner surface of tire casings to increase their resistance to penetration by air and thereby to minimize premature failures of recapped tires. In order for such a liquid material to be effective it must stay in place in spite of the continual flexing of the tire and the heat buildup which occurs. It has been found that preparation and cleaning of the inner surface of the tire is critical to the successful application of the liquid air barrier material. Mold release compounds which are used during the original fabrication of the tire remain on the interior of the tire casing, preventing satisfactory adhesion and leading to peeling of the coating in service.

Two basic techniques have been used to properly prepare the inner surface of a tire. One is sandblasting, which gives quite satisfactory results but the practical difficulties in this technique make it unattractive compared to the second method, i.e., mechanical abrasion by wire brushing. It has been found that manual wire brushing gives inconsistent results and does not always prepare the surface adequately. This is true even if the wire brush is motor driven. An especially designed apparatus is required in order to obtain a complete, consistent and satisfactory surface preparation. To prevent undue delay in the production of recapped tires, such an apparatus must be rapid as well as thorough. It should be, at least in part, automated to minimize the manual effort and it must be able to accomodate the wide range of tire sizes encounted in ordinary recapping operations. The apparatus which is the subject of the present invention is satisfactory in all respect to meet the requirements which have been outlined above.

The present invention comprises a novel piece of equipment which is particularly useful in that it insures proper adhesion of the liquid coating to the tire interiors. It is a wholly new apparatus which performs a function that was previously unnecessary and impractical but which became necessary with the development of the liquid air barrier coating.

SUMMARY OF THE INVENTION

In accordance with the present invention, there is provided an apparatus for renovating tire inner liners, which comprises two main portions including first, a support mechanism for holding, spreading and rotating a tire to make possible the application of the second portion. The second portion comprises a power-driven wire brush swivelably mounted on a rotating turret which can be introduced into a spread tire casing. The wire brush traverses and abrades the entire inner surface from bead to bead. The details of the apparatus which will accomplish these tasks will be apparent from the detailed description which follows.

As the tire inner liner is abraded by the wire brush a vacuum source is used to remove the debris which is created by the wire brushing. Once the wire brushing has been completed and the vacuum has removed all the debris, a spray application of the liquid air barrier coating is made to the newly prepared tire interior to complete the renovation process.

BRIEF DESCRIPTION OF THE DRAWINGS

FIG. 1 is an overall elevation view of the tire renovating apparatus constructed and arranged according to the present invention;

FIG. 2 is a plan view taken substantially along the line 2—2 of FIG. 1;

FIG. 3 shows a portion of FIG. 2 with the wire brush positioned within a tire casing;

FIG. 4 is a cross-sectional view along the line 4—4 of FIG. 2 illustrating details of means for rotating a tire;

FIG. 5 is an enlarged detail of a portion of the bead drive mechanism taken along the line 5—5 of FIG. 1;

FIG. 6 is an enlarged detail taken along the line 6—6 of FIG. 1 illustrating a second portion of the bead drive mechanism;

FIG. 7 is an enlarged view taken along the line 7—7 of FIG. 6;

FIG. 8 is an enlarged sectional view taken along the line 8—8 of FIG. 3 illustrating horizontal and vertical pivots;

DESCRIPTION OF THE PREFERRED EMBODIMENT

Figure 9:
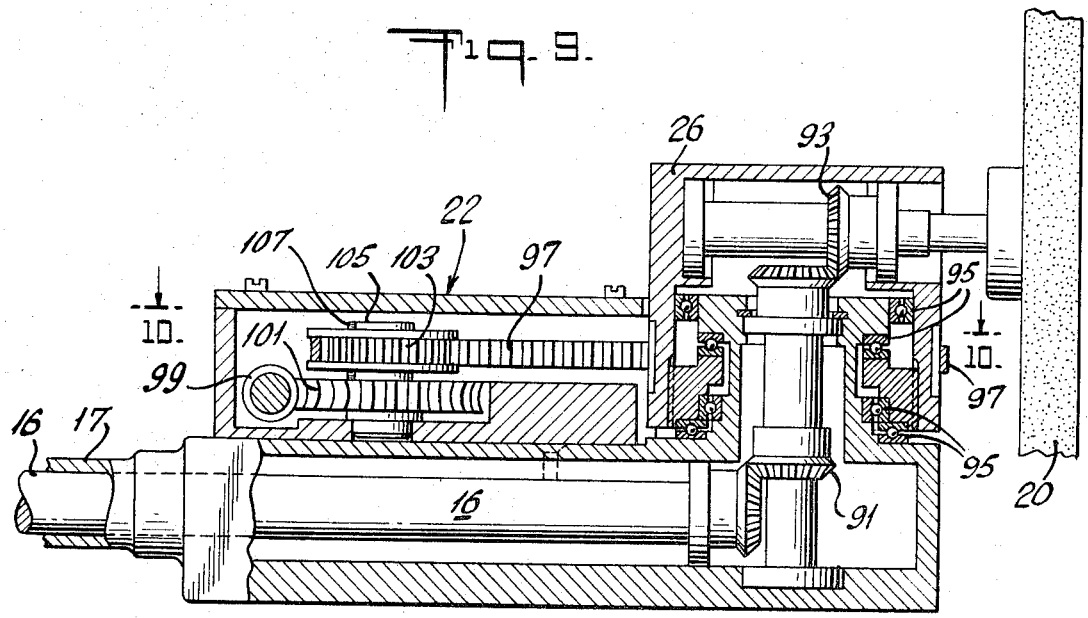
FIG. 9 is an enlarged sectional view taken along the line 9—9 of FIG. 2 illustrating the structure of the turret and its drive mechanism.

While for illustrative purposes and for the sake of completeness a bead drive mechanism has been illustrated, the specific mechanism which is illustrated is not considered to be an essential part of the invention except insofar as some support and drive mechanism for the tire is required. A bead drive mechanism is the preferred method for holding, spreading and rotating a tire casing while its inner surface is cleaned and application is made of a liquid air barrier coating. Other suitable means may also be employed to accomplish the same result. One alternative means is a mechanism which supports and drives a tire by means of its external tread. The principal objectives of any mechanism are to hold the tire securely against the forces which will be imposed by the wire brushing operation, to spread it for inspection purposes as well as to admit the wire brushing device, and to rotate it. The bead drive means which is shown accomplishes these objectives.

FIG. 1 illustrates an elevation view of the wire brushing apparatus in its normal operative horizontal or down position and in a raised position (see broken lines) which is normally used while tires are being changed on the bead drive mechanism. A wire brush 20 is mounted on a swivelable turret 26. The position of the turret 26 is determined by the position of crank 24. The wire brush 20 is driven by means of a pair of bevel gears (not shown) within the housing generally designated 22 and to be described more fully later. The wire brush 20 is driven by a standard motor 14 through belt 15 and its associated pulleys and rotating shaft 16, which is contained within a sleeve 17. The wire brushing apparatus and its driving means are mounted on a carriage 30 which in turn is slidably mounted on a fixed base 12. As will be more fully described hereinafter the carriage 30 may pivot in vertical and horizontal directions about pivots 32 and 34 respectively. An operating handle 18 combined with an integral switch (not shown) is mounted on sleeve 17. The machine operator positions the wire brush manually while grasping handle 18. The integral switch operates the motor 14 which drives wire brush 20. The outermost portions of the bead drive mechanisms, shown in FIGS. 2, 4, 5 and 6 are shown generally as 28 in FIG. 1. A tire 44 is illustrated schematically, mounted on the driving flanges 28.

FIG. 2 shows a phantom view of the apparatus in operating position within the tire 44. The wire brushing mechanism is free to pivot horizontally about pivot 34 (FIG. 1) and also can pivot vertically about pivots 32. In order for the wire brush 20 to be moved in and out of the tire casing it must have the ability to move radially with respect to fixed base 12. FIG. 2 shows the essential portions of the means by which radial movement is accomplished. The wire brush 20, its rotating turret 26, drive shaft 16 and sleeve 17, and motor 14 with its drive belt 15 and pulleys are all mounted on carriage 30. In order to permit radial movement with relation to the fixed base 12 a pair of parallel horizontal extending rods 36 are provided. The rods 36 pass through and are secured to sleeves 42 which are attached by a yoke 86 to the fixed base 12. The rods 36 are free to slide through frictionless guides 38 which are fixed to carriage 30. Thus the carriage 30 carrying the wire brush 20 and its drive means may move horizontally in relation to fixed base 12 by sliding along rods 36, thus providing the needed radial movement of the wire brush. Rotation about horizontal pivots 34 provides a second degree of freedom of horizontal movement so that the wire brush may assume any directed position within a horizontal plane cutting through the tire.

The design or placement of the components upon the slidably carriage 30 is such as to counterbalance the apparatus so that in the normal horizontal operating position and with the wire brush in the forward position, the weight of the mechanism is against the adjustable stop 89. As the wire brush is withdrawn from the tire and the slidable carriage 30 is moved to the full rearward position by handle 18, the counterbalance action raises and holds the brush in the raised position.

The tire 44 is illustrated in contact with a single one of the three tire bead gripping mechanisms 28, two of which drive the tire while the third is an idler. Each mechanism 28 comprises a pair of flanges including an inner fixed flange 48 and outer movable flange 46, which catch the tire at its beads. By means to be described in connection with FIGS. 5 and 6, the outer flange 46 is moved away from the inner fixed flange 48 to spread the tire for easy access. To accomplish the relative movement of the flanges the outward flange 46 is attached to an extensible shaft 47 which moves within fixed sleeve 49 which is attached to the inner flange 48. The fixed sleeve 49 and the inner flange 48 are attached to a fixed plate 50. The extensible shaft 47 passes through the mounting plate 50 and is supported by bearings attached to movable plate 58. A cylinder operator 60 is mounted on a base plate 51 in fixed spatial relationship to base plate 50. The cylinder operator 60 is attached to movable plate 58 which may move either toward or away from the plate 50. The extensible shafts 47 are mounted on this movable plate 58 in order that they may be moved away from fixed flange 48 which is mounted on base plate 50. The drive flanges 46 and 48 are driven by a motor 52 which is connected by means of primary and secondary pulleys 54 and 56 to the two drive flanges. The idler flanges are not driven, but are moveable in a horizontal direction in order to press against the tire casing and thereby to assure proper traction of the drive flanges. In order to make this horizontal movement, cylinder 62 is attached to movable plate 58 and to the idler flanges, as will be seen in subsequent illustrations, FIGS. 4, 6 and 7.

FIG. 3 is an additional plan view of the apparatus illustrating the position of the wire brush in relation to the tire wherein the wire brush has made a maximum traversal of the circumference of the inner portion of the tire casing. It is generally necessary to prepare half of the tire with one rotation of approximately 90°-120° movement of the turret head and thereafter to disengage the wire brushing mechanism, remove the tire and reverse it in order to complete the operation on the opposite side of the tire casing. If the turret and wire brush are sufficiently small, it is possible to make only a single pass around the entire circumference. In some cases, however, as illustrated here, it may be necessary to do one-half of the tire and then reverse it to do the remainder. In this illustration the carriage 30 has been moved to its maximum forward position in order for the wire brush 20 to contact the tire 44. AS it is disengaged it may be moved in the opposite direction as illustrated more clearly in FIG. 2.

FIG. 4 shows an enlarged section along line 4—4 of FIG. 2 in order to illustrate the means of rotating the bead drive flanges 46 and 48. Motor 52 drives through primary and secondary belts 54 and 56, two of the three bead contacting flanges. Movable subplate 58 is also illustrated. Cylinder 62 is mounted on plate 58 and operates through arms 80 and 78 to move the shaft for the idler flange horizontally, pivoting around a pin 76 attaching arm 78 to the plate 58.

FIG. 5 illustrates an enlarged section along line 5—5 of FIG. 1, which shows one of the two driven bead flanges. Reference should also be made to FIG. 2 in order to move clearly understand the operation of the illustrated bead drive mechanism. Inner flange 48 is connected to one end of fixed sleeve 49. The other end of fixed sleeve 49 passes into bearing 70 which is held by retainer 72 onto fixed plate 50. The extensible shaft 47 passes through fixed plate 50 and is held within bearing 64 which is attached to movable plate 58, which as will be seen from FIG. 2, may be moved in or out by means of the cylinder operator 60. Flange 46 also moves in or out under the control of the cylinder operator 60. Tire 44, illustrated in part, is caught by the flanges 46 and 48 so that when extensible shaft 47 moves outwardly the tire is spread between the flanges for easy egress of the wire brush apparatus. Extensible shaft 47 has a pulley 68 mounted on it and fixed to the shaft by key 74 which slides in an elongated keyway 75. Pulley 68 is connected to the motor 52 by means of the secondary and primary drive belts 56 and 54. In operation, the movable plate 58 is moved back close to plate 51 by actuating cylinder operator 60 so that the drive flanges 46 and 48 are close together. A tire is placed upon the drive flanges. Cylinder operator 60 is actuated in order to move plate 58 forward, thus driving the outer flanges 46 away from the inner flange 48 and thereby spreading tire 44 for entry of the wire brushing mechanism. The rotation of pulley 68 drives both the inner flange 48 and outer flange 46 which rotates the tire 44 which is held thereon.

FIG. 6 illustrates a section along line 6—6 of FIG. 1 showing the idler flanges. Reference should also be made to FIG. 2. FIG. 6 is similar to FIG. 5 in that extensible shaft 47 is moved outwardly when movable plate 58 is driven forward by cylinder operator 60, thus spreading the tire as was the case in FIG. 5. The flanges are not driven but act as idlers since the extensible shaft 47 passes through plate 50 and is free to rotate within an opening in arm 78 which is pivotably attached by means of a pin 76 to the movable plate 58. Cylinder operator 62 mounted on plate 58 operating through an arm 80, is able to move extensible shaft 47 in a generally horizontal direction. This horizontal movement is permitted by a slot 82 shown in FIG. 7. It can be seen that the cylinder operator 62 imparts horizontal movement to the entire shaft assembly in order to pull the tire 44 against the pair of driven flanges to insure good traction needed to rotate the tire.

FIG. 8 illustrates the dual pivots which permit carriage 30 with the wire brush and drive assembly to move vertically and horizontally. Fixed base 12 shown in FIG. 1 provides a rigid support. The entire apparatus is attached to outer yoke 86 which can rotate horizontally about pivot 34. Limited movement in the vertical direction is provided by pivots 32 which connect the outer yoke 86 and the inner yoke 84. It can be seen that any combination of horizontal and vertical positions may be obtained by means of this dual yoke system.

The combined effect of the horizontal pivot 34, the vertical pivot 32 and the sliding movement of carriage 30 relative to the fixed base permits positioning of the wire brush assembly at any desired location relative to the tire.

FIG. 9 shows a cross-sectional view of the means by which the wire brush 20 is positioned and rotated relative to a tire casing. Rotating shaft 16 passes through a double set of bevel gears 91 and 93 in order to provide power to the wire brush 20. The wire brush 20 is carried by turret 26 which swivels in a horizontal direction for approximately 180° on bearings 95. A toothed belt 97 passes completely around the turret 26 and engages notches provided thereon. The means for positioning the wire brush is shown in this embodiment as a manual gearing arrangement utilizing a spiral worm gear 99 interacting with a worm wheel 101 which is attached rigidly to the same shaft 105 as secondary gear 103, which in turn drives the toothed belt 97.

Figure 10:
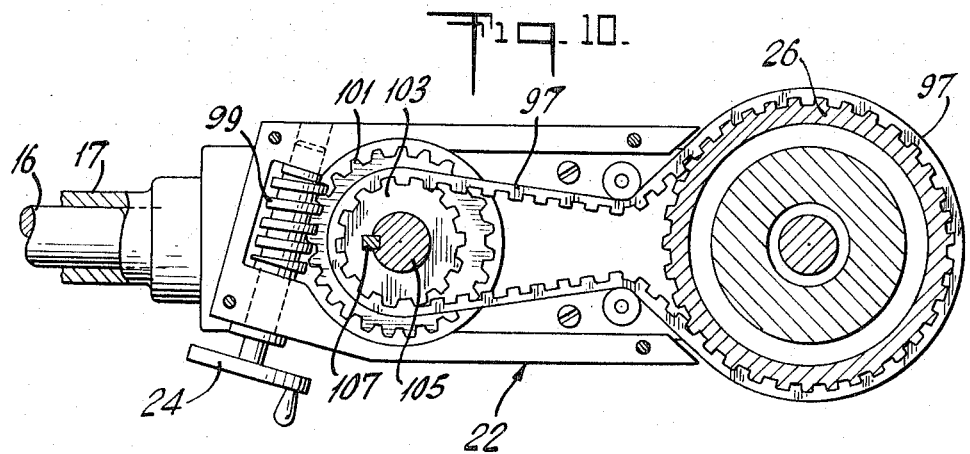
FIG. 10 is a sectional view taken along the line 10—10 of FIG. 9 illustrating the belt drive for the turret and the wire brush.

The means by which the wire brush is swiveled with its turret 26 is more clearly seen in FIG. 10. In this embodiment the turret 26 is rotated manually by turning hand crank 24. It is within the scope of the invention to provide an automated means for operating the gear mechanism in order to assure a uniform brushing of all tire casings and to minimize the manual effort required by the operator of the machine.

The foregoing embodiment illustrates the preferred method and apparatus for carrying out the present invention, but it is recognized that various modifications may be made therein without substantially departing from the spirit of the present invention which is defined by the scope of the claims which follow.

What is claimed is:

1. A tubeless tire renovating apparatus comprising:
   a. a fixed base member;
   b. a first U-shaped support yoke pivotably attached at its middle to said base member to rotate in a horizontal plane about said base;
   c. a second U-shaped support yoke pivotably attached at its ends to the ends of said first yoke whereby said second yoke may be moved relative to said first yoke in a vertical plane;
   d. a pair of cylindrical sleeves rigidly attached to the ends of said second yoke;
   e. a pair of rods passing through said sleeves and attached therein at their midpoints;
   f. a support carriage plate having guides for said rods attached thereto, thereby permitting sliding movement of said carriage parallel to said rods;
   g. motor mounted on said carriage plate for driving a rotatable shaft supported by bearings mounted on said carriage plate, said shaft extending beyond said plate;
   h. a wire brush driven by said rotatable shaft through a double set of bevel gears disposed therebetween, said wire brush swivelably mounted in a housing in fixed relation to said shaft and containing means for swiveling said brush.

2. The apparatus of claim 1 further comprising means for supporting, spreading and rotating said tubeless tire.

* * * * *